(12) United States Patent
Savchenko

(10) Patent No.: US 10,175,061 B2
(45) Date of Patent: Jan. 8, 2019

(54) METHOD AND APPARATUS TO MEASURE MOTION CHARACTERISTICS FOR BICYCLES AND ANY VEHICLES ON WHEELS

(71) Applicant: Vladimir Savchenko, Vancouver (CA)

(72) Inventor: Vladimir Savchenko, Vancouver (CA)

(*) Notice: Subject to any disclaimer, the term of this patent is extended or adjusted under 35 U.S.C. 154(b) by 303 days.

(21) Appl. No.: 15/038,716

(22) PCT Filed: Nov. 21, 2014

(86) PCT No.: PCT/CA2014/000845
§ 371 (c)(1),
(2) Date: May 23, 2016

(87) PCT Pub. No.: WO2015/074140
PCT Pub. Date: May 28, 2015

(65) Prior Publication Data
US 2016/0298983 A1   Oct. 13, 2016

Related U.S. Application Data

(60) Provisional application No. 61/906,897, filed on Nov. 21, 2013.

(51) Int. Cl.
*G06F 11/30* (2006.01)
*G01C 22/00* (2006.01)
(Continued)

(52) U.S. Cl.
CPC ............ *G01C 22/002* (2013.01); *B62J 99/00* (2013.01); *G01C 19/56* (2013.01); *G01C 25/00* (2013.01);
(Continued)

(58) Field of Classification Search
CPC .................................................. G01C 22/002
See application file for complete search history.

(56) References Cited

U.S. PATENT DOCUMENTS 3,898,563 A   8/1975 Erisman
3,916,234 A   10/1975 Stigall et al.
(Continued)

FOREIGN PATENT DOCUMENTS

EP   1992389   * 11/2008
EP   1992389 A1   11/2008
(Continued)

OTHER PUBLICATIONS

Agilent ADNB-6011 and ADNB-6012 High Performance Laser Mouse Bundles Datasheet; Published by Agilent Technologies, Jul. 4, 2005.
(Continued)

*Primary Examiner* — Phuong Huynh
(74) *Attorney, Agent, or Firm* — Georgiy L. Khayet

(57) ABSTRACT

A sensor system for use with a host device a vehicle having a frame and at least one wheel. The sensor system has a first sensor associated with the at least one wheel of the vehicle. The first sensor generates wheel data indicative of movement of the wheel. The wheel data may be rotational angle, full revolution count, angle of a revolution, direction of revolution, and angular acceleration with respect to a magnetic pole of the Earth or a magnet attached to a frame. The sensor transmits the wheel data to the host device.

24 Claims, 7 Drawing Sheets

(51) Int. Cl.
*G01C 19/56* (2012.01)
*B62J 99/00* (2009.01)
*G01C 25/00* (2006.01)

(52) U.S. Cl.
CPC .. *B62J 2099/002* (2013.01); *B62J 2099/0013* (2013.01)

(56) References Cited

U.S. PATENT DOCUMENTS

| | | | |
|---|---|---|---|
| 5,315,285 | A | 5/1994 | Nykerk |
| 5,570,087 | A | 10/1996 | Lemelson |
| 5,736,923 | A | 4/1998 | Saab |
| 5,864,304 | A | 1/1999 | Gerszberg et al. |
| 6,060,989 | A | 5/2000 | Gehlot |
| 6,154,025 | A | 11/2000 | Schelter et al. |
| 6,154,123 | A | 11/2000 | Kleinberg |
| 6,263,282 | B1 | 7/2001 | Vallancourt |
| 6,366,207 | B1 | 4/2002 | Murphy |
| 6,416,020 | B1 | 7/2002 | Gronskov |
| 6,438,491 | B1 | 8/2002 | Farmer |
| 6,459,365 | B2 | 10/2002 | Tamura |
| 6,502,035 | B2 | 12/2002 | Levine |
| 6,541,959 | B2 | 4/2003 | Gudgeon et al. |
| 6,590,495 | B1 | 7/2003 | Behbehani |
| 6,606,027 | B1 | 8/2003 | Reeves et al. |
| 6,636,149 | B2 | 10/2003 | Moon |
| 6,646,432 | B1 | 11/2003 | Malinowski |
| 6,900,723 | B2 | 5/2005 | Yamanaka et al. |
| 7,079,024 | B2 | 7/2006 | Alarcon |
| 7,411,175 | B2 | 8/2008 | Schwartz |
| 7,983,836 | B2 | 7/2011 | Breed |
| 8,106,757 | B2 | 1/2012 | Brinton et al. |
| 8,136,969 | B2 | 3/2012 | Burkett |
| 8,779,935 | B2 | 7/2014 | Savchenko |
| 2001/0009367 | A1 | 7/2001 | Seitzer et al. |
| 2003/0122663 | A1 | 7/2003 | Carlson et al. |
| 2003/0220722 | A1 | 11/2003 | Toba et al. |
| 2004/0022416 | A1 | 2/2004 | Lemelson et al. |
| 2004/0036587 | A1 | 2/2004 | Jefferson |
| 2005/0035878 | A1 | 2/2005 | Vassilevsky |
| 2005/0175186 | A1 | 8/2005 | Yasushi et al. |
| 2005/0195094 | A1 | 9/2005 | White |
| 2005/0232432 | A1 | 10/2005 | Yasushi et al. |
| 2005/0246100 | A1 | 11/2005 | Nath et al. |
| 2006/0001532 | A1 | 1/2006 | Nagata |
| 2006/0085635 | A1 | 4/2006 | Park |
| 2013/0024137 | A1 | 1/2013 | Grassi |

FOREIGN PATENT DOCUMENTS

| | | |
|---|---|---|
| WO | 2008024361 A2 | 2/2008 |
| WO | 2009142932 A1 | 11/2009 |

OTHER PUBLICATIONS

International Searching Authority, International Search Report, PCT/CA2014/000845, dated Feb. 24, 2015, 9 pages.
Patent Cooperation Treaty—International Searching Authority, International Search Report, dated Apr. 10, 2008, 2 pages.
PLN2020 twin-eye laser sensor; Published by Philips Electronics N.V. Sep. 2005.

\* cited by examiner

Magnetic field calibration. Axis X and Z

Magnetic field calibration. Y and Z axis

Magnetic field calibration. X and Y axis

METHOD AND APPARATUS TO MEASURE MOTION CHARACTERISTICS FOR BICYCLES AND ANY VEHICLES ON WHEELS

RELATED APPLICATIONS

This application is a 371 of International PCT Application No. PCT/CA2014/000845 filed Nov. 21, 2014.

International PCT Application No. PCT/CA2014/000845 claims benefit of U.S. Provisional Patent Application Ser. No. 61/906,897 filed Nov. 21, 2013, now expired.

The contents of all related applications cited above are incorporate herein by reference.

TECHNICAL FIELD

The present invention relates to sensor systems for non-powered vehicles and, more particularly, to multi-sensor systems for measuring and/or recording motion characteristics of non-powered vehicles such as bicycles.

BACKGROUND

The term "powered vehicle" will be used herein to refer to a vehicle having an internal source (e.g., internal combustion engine, battery) of electrical power. Examples of powered vehicles include cars, motorcycle, and all-terrain vehicles (ATVs). The term "non-powered vehicle" will be used herein to refer to any vehicle that is not normally equipped with a power source capable of providing electrical power. Examples of non-powered vehicles include bicycles, tricycles, quadracycles, velomobiles, skateboards, rollerblades, and scooters. Powered vehicles typically include sensors from which certain operational characteristics of the vehicle may be measured. Non-powered vehicles, on the other hand, are not typically manufactured with a sensor infrastructure for determining operational characteristics of the non-powered vehicle.

The operator may have the desire to measure and/or record certain operating characteristics of either powered or non-powered vehicles. While a powered vehicle may have the sensor infrastructure for measuring and/or recording operating characteristics, the data collected by this sensor infrastructure may not be what the operator desires to measure and/or record and is, in most cases, typically not made available to the typical operator in a usable form. And non-powered vehicles are typically devoid of any sensor infrastructure for measuring and/or recording vehicle operating characteristics.

The need thus exists for systems and methods that provide a sensor infrastructure to powered and non-powered vehicles to facilitate the measurement and/or recording of operational characteristics of the powered or non-powered vehicle.

SUMMARY

The invented apparatus is a set of devices commonly called sensors which could be mounted in different places on a non-powered vehicle such as bicycle, tricycle, wheel chair, car or any other vehicles on wheels to accurately measure: the angle of the wheel motion, direction of the wheel motion, linear distance, speed, acceleration, the angle or the grade of a road surface, g forces applied on a wheel and the frame of the vehicle, the angle of lateral motion of the wheel and the frame of the vehicle, and the frequency of this lateral motion.

The present invention may be embodied as a sensor system for use with a host device and a vehicle comprising a frame and at least one wheel. The sensor system comprises a first sensor associated with the at least one wheel of the vehicle. The first sensor generates wheel data indicative of movement of the wheel such as rotational angle, full revolution count, angle of a revolution, direction of revolution, and angular acceleration with respect to a magnetic pole of the Earth or a magnet attached to a frame and transmits the wheel data to the host device.

The present invention may also be embodied as a sensing method for use with a host device and a vehicle comprising a frame and at least one wheel. The sensing method comprising the steps of associating a first sensor with the at least one wheel of the vehicle and causing the first sensor to generate wheel data indicative of movement of the wheel with respect to a magnetic pole of the Earth or a magnet attached to a frame and to transmit the wheel data to the host device.

The present invention may also be embodied as a sensor system for use with a host device a vehicle comprising a frame and at least one wheel. The sensor system comprises a first sensor associated with the at least one wheel of the vehicle and a second sensor associated with the frame of the vehicle. The first sensor comprises a first magnetometer. In addition the first sensor may comprise a first accelerometer MEMS, and a first gyroscope MEMS. The second sensor comprises a second accelerometer MEMS and a second gyroscope MEMS. The first sensor generates wheel data indicative of movement of the wheel with respect to a magnetic pole of the Earth or a magnet on a frame based on raw data generated by at least one of the first magnetometer and transmits the wheel data to the host device. In addition the first sensor may generate data from the first accelerometer MEMS, and the first gyroscope MEMS and transmits the wheel data to the host device. The second sensor generates frame data indicative of movement of the frame with respect to a direction of gravity based on raw data generated by at least one of the second accelerometer MEMS and the second gyroscope MEMS, and transmits the frame data to the host device.

The present invention may also be embodied as a sensor system for use with a host device a vehicle comprising a frame and at least one wheel. The sensor system comprises a frame sensor associated with the frame of the vehicle. The frame sensor generates frame data such as the grade of an angle of travelling surface relative to horizon in percent, the direction of the gravity g force, cadence, the lateral leaning angle and the frequency of change for lateral leaning from left to right indicative of movement of the frame with respect to a direction of gravity and transmits the frame data to the host device.

The present invention may also be embodied as a sensing method for use with a host device and a vehicle comprising a frame and at least one wheel. The sensing method comprising the steps of associating a frame sensor with the frame of the vehicle and causing the frame sensor to generate frame data indicative of movement of the frame with respect to a direction of gravity and to transmit the frame data to the host device.

DETAILED DESCRIPTION

Figure 1:
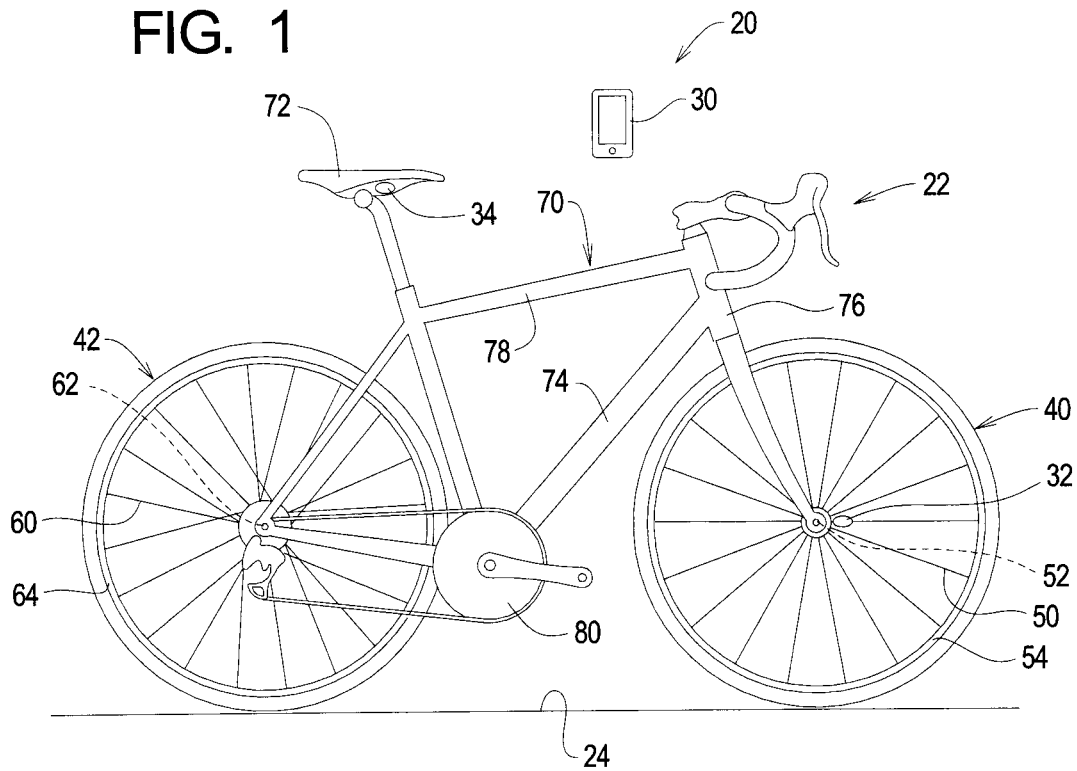
FIG. 1 is a side elevation view illustrating a vehicle with which a sensing system of the present invention is associated.
Figure 2:
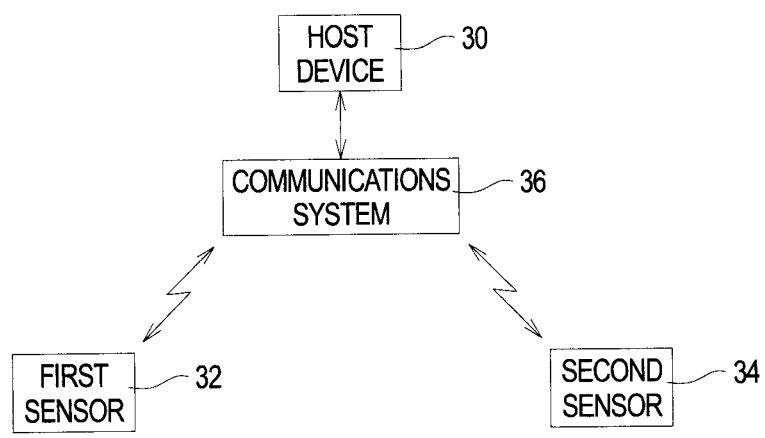
FIG. 2 is a basic block diagram illustrating major components of a sensing system of the present invention.

Referring initially to FIGS. 1 and 2 of the drawing, depicted therein an example sensor system 20 adapted to measure and/or record operating characteristics of a non-powered vehicle, in this example a bicycle 22. The example bicycle 22 is or may be conventional and will not be described herein beyond that extent necessary for a complete understanding of the present invention. The example sensor system 20 can also be used in other vehicles, such as tricycle, recumbent bicycle, wheel chair, motorcycle, or car, to measure, process, and/or record data associated with operational characteristics of the vehicle. The bicycle 22 is configured to travel on a surface 24 such as the ground, a road, a sidewalk, a trail, or the like.

The example sensor system 20 comprises at least one host device 30, a first sensor 32, and a second sensor 34. The example host device 30 is a general purpose computing device, such as a cell phone, having wireless communications capability. The example host device 30 is mounted on the bicycle 22 or carried by the rider of the bicycle 22. The example host device 30 may be a mobile device such as a cellular phone, tablet, iPod or other media player, a smart watch, a head mounted display or glasses such as Google Glass, a helmet display, a display built into the visor of a cap, a car media system, a car on-board computer, or other device capable of communicating wirelessly with the first and second sensors 32 and 34 as described below. The host device 30 further runs software that will be referred to herein as the host sensor application. The host sensor application implements logic and processing to accumulate, stored, process, and/or display wheel data generated by the first sensor 32 and frame data generated by the second sensor 34.

The first sensor 32, also referred to as a wheel sensor, is configured to measure the wheel motion characteristics, such as angle of a wheel rotation, position of a wheel rotation, forward or reverse direction of a wheel rotation, linear distance covered by a wheel in forward or reverse direction, angular and linear speed of a wheel, and/or angular and linear acceleration of a wheel. The measurements taken by the first sensor 32 are encoded as wheel data that may be transmitted to the host device 30.

The second sensor 34, also referred to as a frame sensor, is configured to measure various frame motion characteristics, such as grade of a road slope, lateral motion frequency and amplitude, lateral (left or right) leaning angle, and/or g forces. As will be described in further detail below, the first and second sensors 32 and 34 are also provided with wireless communication capability compatible with the wireless communication capability of the example host device 30. The measurements taken by the second sensor 34 are encoded as frame data that may be transmitted to the host device 30.

In the example sensor system 20 as depicted in FIG. 1, the example first or wheel sensor 32 is mounted on or associated with a front wheel 40 of the bicycle 22. The example first or wheel sensor 32 could also be mounted on or associated with a rear wheel 42 of the bicycle 22. In particular, the first or wheel sensor 32 may be mounted on a spoke 50, hub 52, rim 54 of the front wheel 40 or a disc (not shown) associated with that front wheel 42. Similarly, the first or wheel sensor 32 may be mounted on a spoke 60, hub 62, rim 64 of the rear wheel 42 or a disc (not shown) associated with that rear wheel 42. The principle of operation of the first sensor 32 is not altered by placement of the first sensor 32 on either wheel (e.g., front or rear), any wheel position (e.g., spoke, hub, rim, or disc), and either side (e.g., right or left) off the wheel. The exact mounting location of the first sensor 32 is thus determined by user preference and/or mechanical expediency.

The second sensor 34 is mounted on or otherwise associated with a frame 70 of a bicycle 22. For example, the second sensor 34 may be mounted under a seat 72 secured to the frame 70 as shown in FIG. 1 or to the frame 70 itself. FIG. 1 illustrates that the frame 70 further comprises down tube 74, a head tube 76, and top tube 78. A crank 80 of the bicycle 22 is supported for rotation relative to the frame 70 as is conventional.

The communications system formed by the communications capabilities of the host device 30 and the first and second sensors 32 and 34 allows sensor data measured and/or stored by the example first and second sensors 32 and 34 to be communicated to the example host device 30 for further storage and/or processing. Control data may also be communicated from the example host device 30 to the example first and second sensors 32 and 34. The data from both sensors can be received wirelessly by the host device 30. The data received from the sensors by the host device can thus be stored and used to calculate additional characteristics of the vehicle's motion. Generally speaking, the data generated by the first or wheel sensor 32 will be referred to herein as wheel data, and the data generated by the second or frame sensor 34 will be referred to as frame data.

Figure 3:
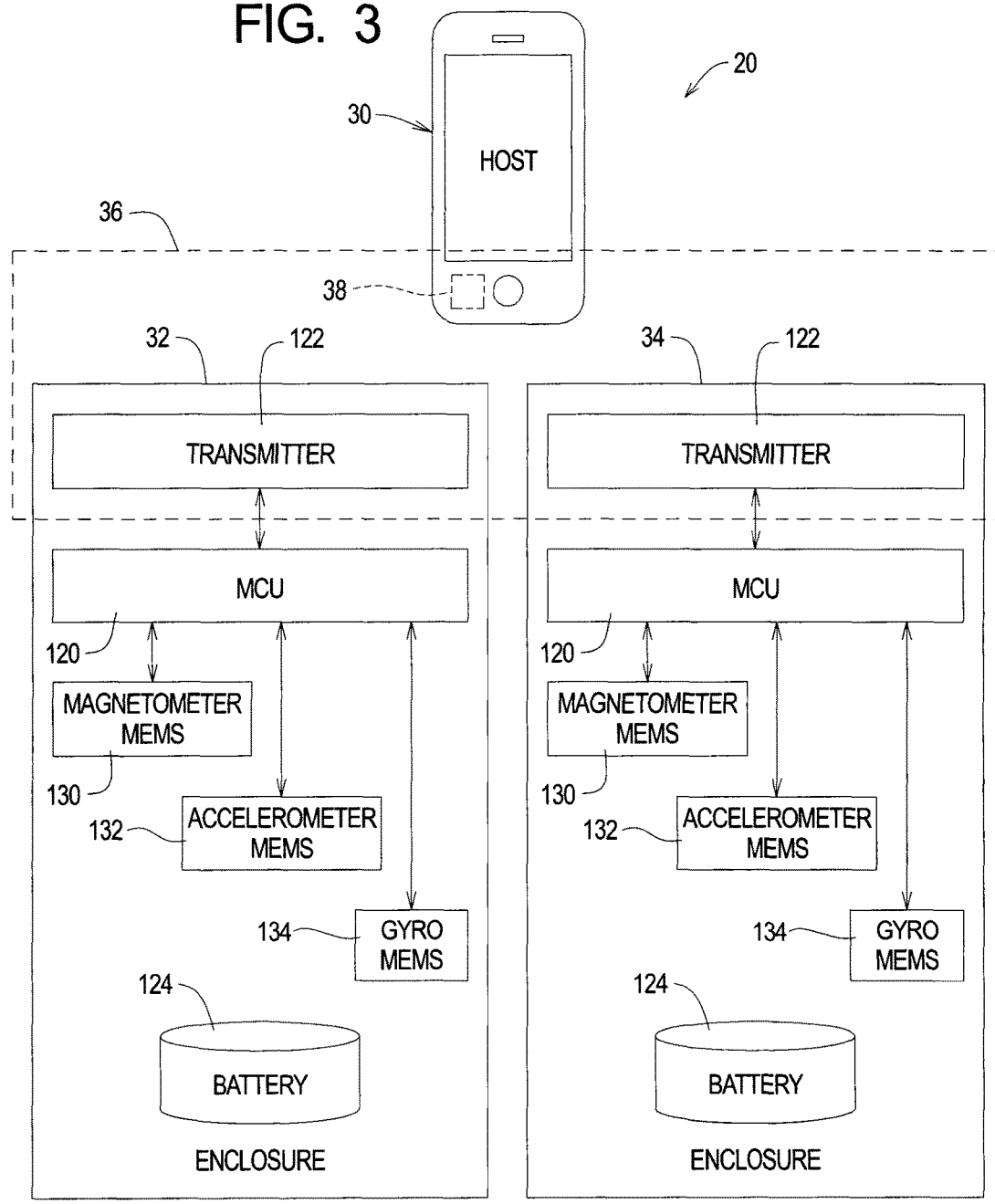
FIG. 3 is a detailed block diagram depicting details of one example of a sensing system of the present invention.

The block diagram of FIG. 3 of the drawing illustrates that each of the sensors 32 and 34 comprise at least one microcontroller (MCU) 120, at least one wireless transmitter 122, at least one battery 124, and, in the example sensor system 20, first, second, and third micro-electromechanical systems (MEMS) 130, 132, and 134. The MCU 120, transmitter 122, battery 124, and first, second, and third MEMS 130, 132, and 134 are arranged within a single enclosure 136, but separate enclosures may be provided for one or more of the MEMS 130, 132, and 134.

In the example depicted in FIG. 3, the first MEMS 130 is a 3-axis magnetic field MEMS, also known as magnetometer or electronic compass, designed to measure direction of the North Pole or the South Pole of the earth. Common magnetic field MEMS that may be used as the first MEMS 130 are manufactured by, as examples, Analog Devices, Austrian Semiconductors, Honeywell Microelectronics, STMicroelectronics.

The second MEMS 132 is a 3-axis accelerometer or g (gravity) MEMS is designed to measure acceleration along each of three orthogonal axis X, Y and Z. Common accelerometer MEM that may be used as the second MEMS 132 are manufactured by, as examples, Analog Devices, Freescale Semiconductors, STMicroelectronics, and InvenSense.

The third MEMS 134 is a 3-axis gyro or gyroscope MEMS designed to measure angular acceleration of a rotational motion along three orthogonal axis X, Y, and Z. Sometimes the three orthogonal axes are used to measure roll, pitch and yaw of an object. Common gyro MEMS that may be used as the third MEMS 134 are manufactured by, as examples, Analog Devices, Freescale Semiconductors, STMicroelectronics, and InvenSense.

Each of these first, second, and third MEMS 130, 132, and 134 can be integrated into described sensors 32 or 34 as separate electronic components or may be combined to form what is commonly referred to as 3, 6, or 9 axis sensor or MEMS.

The at least one MCU 120 processes, filters, and/or conditions the raw data generated by the MEMS 130, 132, and 134 to obtain wheel data in the case of the first sensor 32 and frame data in the case of the second sensor 34. The at least one wireless transmitter 122 implements at least one wireless communication system using protocols such as Bluetooth, ANT+, or Zigbee. The at least one host device 30 is also capable of wirelessly communicating with multiple sensors such as the example sensors 32 and 34 and possibly other types of sensors by implementing at least one wireless protocol such as Bluetooth, ANT+, or Zigbee. Typically, at least one of the wireless protocol or protocols implemented by the sensors 32 and 34 is compatible with at least one of the wireless protocol or protocols implemented by the host device 30. The battery 124 provides power to the various components 120, 122, 130, 132, and 134 as necessary to allow the sensors 32 and 34 to operate without a connection to an external power source.

The sensor system 20 is designed to measure one or more motion parameters of the vehicle 22 as will now be described in further detail below.

1. Angle of Wheel Rotation

Figure 4:
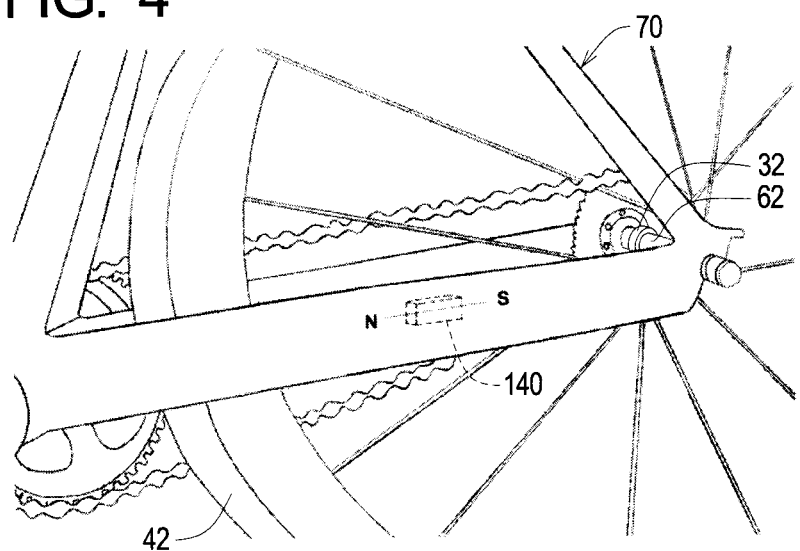
FIGS. 4 and 5 are perspective views depicting one example of wheel sensor of the invention, where the example wheel sensor is mounted to a rear hub of a bicycle forming the vehicle of FIG. 1.

As shown on FIG. 4, in one embodiment of the example sensor system 20 the first or wheel sensor 32 may be positioned on the hub of either wheel 40 or 42, in this case the rear wheel hub 62 of the rear wheel 42. Optionally, a magnet 140 with either North or South Pole directed toward the wheel sensor 32, is mounted on a fixed part of the frame 70 supporting the axel. The magnet 140 creates a magnetic field projected on the wheel sensor 32 that is stronger than the magnetic field of the earth. The optional magnet 140 may be used when the strength of the magnetic field of the earth is changing or there are other magnetic fields present which can interfere with the magnetic field of the earth. In this case, the permanent magnet creates an artificial "North or South Pole" effect on the wheel sensor 32. The wheel sensor 32 measures an angle of the wheel motion using the magnetic field from the magnet 140 as a point of reference for the magnetic pole.

Figure 5:
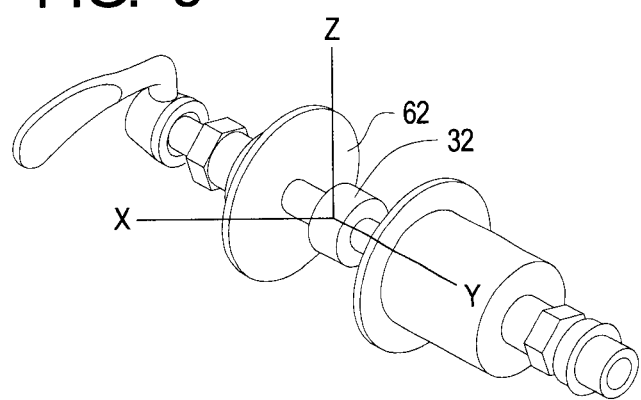

FIG. 5 illustrates an embodiment of the sensor system 20 in which that the wheel sensor 32 is attached to the rear wheel hub 62. In this example, the first MEMS 130 is or incorporates a magnetic field MEMS and is located inside the wheel sensor 32 to detect the direction of a magnetic field of the earth, which is projected along each of its three axes (depicted as X, Y, and Z in FIG. 5) and transmits this information to the MCU 120 as wheel data. The MCU 120 uses this three dimensional wheel data to calculate the direction of the magnetic field of the earth in 3-D relative to the revolving position of the wheel sensor 32 on the hub 62. When the wheel rotates the change of the projected magnetic field of the earth's pole is detected periodically and the angle of the wheel rotation is calculated.

Depending of the orientation of the magnetic field sensor of the first sensor 32, only two of the three axes will detect the largest relative change of the magnetic field of the earth. As shown on FIG. 5 and FIG. 6, the X and Z axes will have a major effect on the measurement of the earth's magnetic field, while the Y axis has a lesser effect. However, all three axes are used for calculation of the earth's magnetic field to offset the shift of the magnetic field measurements when the vehicle 22 is turning relative to the North or South Pole of the earth.

Figure 6:
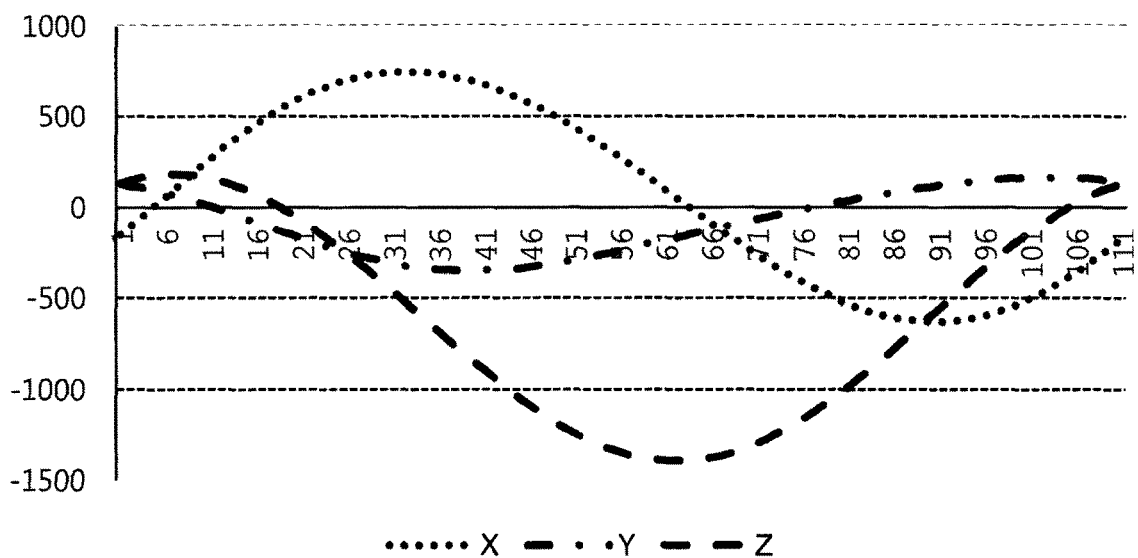
FIGS. 6 and 7 are data plots illustrating an example of the generation of calibration data based on raw data generated by the magnetometer MEMS of a wheel sensor of the present invention.

To measure the angle of the wheel rotation, the first or wheel sensor 32 is calibrated. One way to calibrate the wheel sensor 32 is to lift, typically using a jack or a holder (not shown), the wheel associated with the sensor 32. In the example of FIGS. 5 and 6, the rear wheel 42 would be lifted such that the wheel 42 and wheel sensor 32 are suspended (e.g., above the ground surface 24). The wheel is then caused to turn in the direction associated with forward motion of the vehicle 22 at a rate of about 1 to 3 revolution per second. The wheel 42 is then allowed to spin free, with as little resistance as possible.

While the wheel 42 is free spinning, the MCU 120 samples X, Y, and Z values from the magnetometer of the first MEMS 130 and records these values in a calibration table in internal memory of the MCU 120. The sampling frequency of the magnetic field MEMS 130 is determined by the technical characteristics of the particular magnetometer MEMS, the productivity of the custom logic implemented by the MCU 120, and the speed of the communication channel between the MCU 120 and the MEMS 130. Typically the sampling rate ranges between 200 Hz to 400 Hz but can be even higher with faster MCUs and MEMS. The logic implemented by software running on the MCU 120 analyzes the calibration table and detects when the wheel completes a full revolution by comparing X, Y, Z values in the beginning of the calibration table with the new X, Y, Z values. When the wheel completes a full revolution, the current X, Y, Z values should match the X, Y and Z values in the calibration table within a certain margin. This calibration table is subsequently used to determine the angle of the wheel revolution, the forward or reverse direction of the wheel, and the position of the wheel sensor 32 on the hub 62 relative to the North or South Pole.

Figure 7:
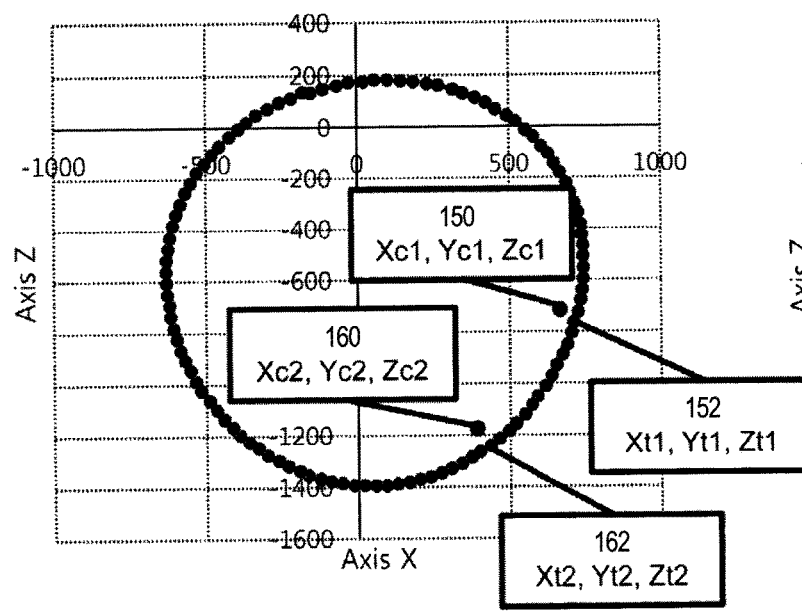
Figure 7:
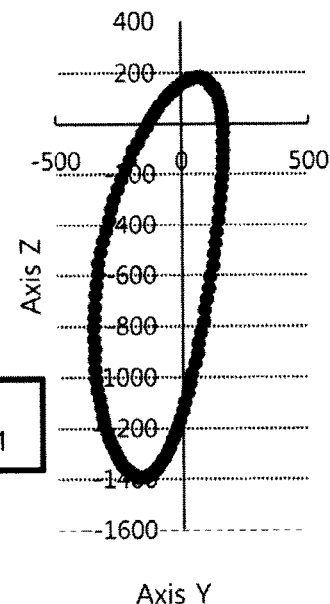
Figure 7:
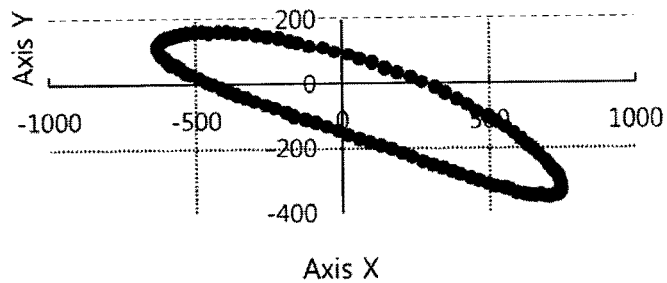

FIGS. 6 and 7 illustrate one example of the process of generating the calibration table using Honeywell's magnetometer MEMS as the first MEMS 130 and the Intel 8051 system as the MCU 120. In this example, wheeldata is recorded at a 200 Hz sampling rate. FIGS. 6 and 7 illustrate that, when the wheel is moving the angle of rotation is calculated from comparing a set of current sampling values 150 ($Xc1$, $Yc1$, $Zc1$) from the magnetic field MEMS 130 with the closest matching values from the calibration table 152 $Xt1$, $Yt1$, $Zt1$. Next, a set of next sampling values 160 ($Xc2$, $Yc2$, $Zc2$) taken at a time interval $Ts$ are matched to calibration table values (162) ($Xt2$, $Yt2$, $Zt2$).

The time interval $Ts$ is limited only by the specifications of a particular magnetic field MEMS and the capacity of the particular MCU to process the data. However, for practical purpose the time interval can be increased to conserve the battery usage. For example $Ts$ can be 10 milliseconds. The MCU can take samples from the magnetic field MEMS every Ts=10 milliseconds, calculate the angle and store the data representing the angle in memory.

The next magnetic field sample is used to calculate the angle and is accumulated (added) in the memory of the MCU until the request (e.g., control data) is generated to transmit to the host the wheel data associated with the total accumulated angle. The transmission request could also be at various time periods however for practical reasons it is usually higher than the sampling time period Ts. E.g. the transmission period Tt can be set at 100 milliseconds. In this example the MCU would accumulate the total angle of wheel rotation Ω (omega), measured in degrees (Ω°), taken during Tt (100 milliseconds) at Ts (10 milliseconds) sampling rate or total 10 samples per 100 milliseconds period.

Because a vehicle can travel in any direction relative to the North Pole, a slight drift in actual measurement compared to the calibration table can happen when the direction of rolling motion is not the same as the direction of the wheel when the calibration table was recorded. To mitigate this drift, the disclosed system can have up to four calibration tables recorded. The first calibration table can be recorded when the vehicle is turned towards the North Pole, the second calibration table can be recorded when the vehicle is turned to the East, the third when the vehicle is turned to the South, and the fourth when the vehicle is turned to the West. However, if the user knows that the traveling path of the vehicle will be along straight path going straight one way and back then only two calibration tables should be sufficient to reach acceptable accuracy. In this case, the first calibration table shall be recorded when the vehicle is turned on the road going one way and the second calibration table recorded when the vehicle turned around 180 degrees or like traveling back to the starting point.

Regardless of the number of calibration tables (e.g., one, two, or four) and the direction when each calibration table was recorded, the host device 30 may be programmed to include logic capable of controlling the wheel sensor to switch calibration table during the ride from one table to the other. The logic in the example host device 30 as described herein is capable of making a decision which table to use at any time. If the host device 30 has a built in compass, like many smartphones do, the host device 30 can be configured to report (e.g., detect and record) the heading direction of the vehicle 22 in degrees relative to the North Pole. For example, if the vehicle travels North, then the system reports a heading of 0 degrees. If the vehicle travels East, then the system reports a heading of 90 degrees. If the vehicle travels South, then the system reports a heading of 180 degrees. And if the vehicle travels West, then the system reports a heading of 270 degrees. In addition or instead, the heading can be detected in degrees relative to the North Pole. For example, a heading of 40 degrees is almost North East, while a heading of 135 degrees would be South West.

The table selection logic could be integrated into the sensor 32 or in an application on the host device 30. In either case, the logic determines actual heading and then instructs the wheel sensor which calibration table to use. If the table selection logic is implemented in the host device 30, the system 20 employs four calibration tables recorded at four different directions as described above, and the current heading is 46 degrees, then the host device 30 instructs the wheel sensor 32 to use the second calibration table, which was recorded in the East direction. In this example, if the heading is 135 degrees, the host device instructs the wheel sensor 32 to use the third table, which was recorded in the West direction. If only two tables are recorded, the first table heading 40 degrees and the second table 220 degrees (180 degrees apart), then at a current heading of 46 degrees the first table would be used, and at current heading of 220 degrees the second table is used.

As described above with reference to FIG. 3, the second or frame sensor 34 has an optional magnetometer MEMS 130, the host device 30 can use the frame data received from magnetometer MEMS 130 of the frame sensor 34 to calculate the heading. In this embodiment, the host device 30 can be a mobile device without built-in compass. The application logic of the host device 30 can configure magnetometer MEMS 130 of the frame sensor 34 to be used as a compass and read the headings during the calibration of the wheel sensor and during the ride. Once frame data associated with current heading is reported by the frame sensor 34, the selection of calibration table may be made as described above.

Dynamic switching between calibration tables increases accuracy of calculating the angle of wheel rotation when the vehicle changes its heading during the ride.

2. Forward and Reverse Wheel Motion

The direction of the wheel rotation can also be detected when comparing three sets of X, Y, Z magnetometer samples taken at time interval Ts. If the sequence of three sets of measurements X, Y, Z corresponds to ascending order of records in the calibration table, then the wheel is moving in the the same direction of rotation when the calibration table was generated. If the calibration is performed following instructions (i.e., by rotating the wheel in the direction of forward motion of the vehicle) then the example in this paragraph would indicate of a forward wheel motion. If, on the other hand, the calibration tables were generated following the calibration instructions and the sequence of three sets of measurements X, Y, Z corresponds to a descending order of records in the calibration table, then the wheel is moving in the reverse direction.

3. Speed and Distance

The MCU 120 can also be configured with the diameter D of the wheel from the host device. The MCU 120 could then be programmed to calculate distance S travelled by the wheel during time period Tt using the following equation (1):

$$S = (Pi \times D) \times (\Omega°/360°) \quad (1)$$

The MCU 120 can also be programmed to calculate a speed V of the wheel motion using the following equation (2):

$$V = S/Tt \quad (2)$$

All this data comprising of angle of wheel rotation Ω, distance S, speed V, time Tt can be transmitted to the host device 30 for further processing.

Figure 8:
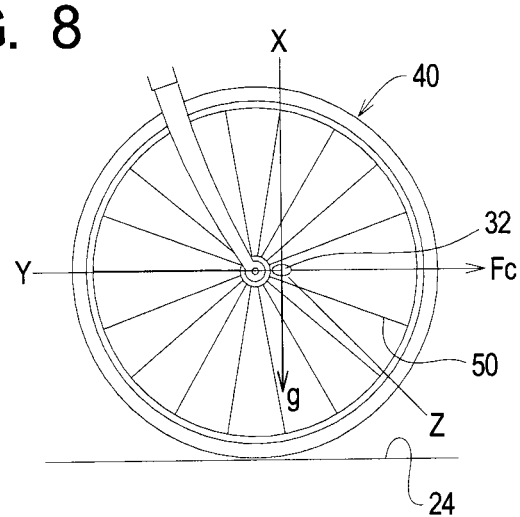
FIG. 8 is a side plan view of a front wheel of a bicycle forming the vehicle of FIG. 1 illustrating the process of determining an angular location of the wheel sensor.

In another embodiment as shown on FIG. 8, the first or wheel sensor 32 is positioned on the spoke 50 of the wheel 40 as depicted above in FIG. 1. Alternatively, the first or wheel sensor 32 may be firmly attached to a disk surface of a solid or spoke-less wheel. In either case, the first or wheel sensor 32 may be configured to measure and record the changing projection of the magnetic field of the Earth as described above in the situation in which the wheel sensor 32 mounted on a hub as shown on FIGS. 4 and 5. In the example depicted in FIG. 8, the pair of axes X and Y associated with the magnetometer MEMS 130 of the wheel sensor 32 will get the maximum projected magnetic field of the Earth when the wheel is rotating. However, all three axes X, Y, and Z are used for calculation of the earth's magnetic field to offset the shift of the magnetic field measurements when the vehicle is turning relative to the North or South Pole of the earth and possible imperfections in installing the wheel sensor 32 on the spokes.

As discussed above, the wheel sensor 32 can detect forward and reverse motion and its own position on the wheel relative to a starting point (e.g., where the wheel 40 touches the ground or the road surface 24). To determine the starting point, the user is asked to set or arrange the wheel 40 so that the wheel sensor 32 is located at the most lower position on the wheel 40. In other words, if the user draws imaginary line from the center of the wheel through the wheel sensor, that line shall continue to the bottom of the wheel 40 where the wheel touches the ground 24. The user then informs the host device 30 that the coordinates measured when the wheel 40 and sensor 32 are in this position are associated with a starting point of the wheel 40. The MCU 120 records the corresponding or matching X, Y, Z values from the magnetometer MEMS 130 as the starting position.

The angle of circular motion, the direction, and the position of the wheel sensor 32 can be applied not only to the wheels of vehicles such as bicycles but to any circularly rotating objects. For example, the same apparatus can measure bicycle crank angle of rotation, direction, and position when a sensor such as the example wheel sensor 32 is attached to the crank 80 of the bicycle 22. The same principle can be applied to any mechanical object which can rotate around a fixed point commonly called an axel.

4. Acceleration of the Wheel

The MCU can also calculate linear rolling acceleration Ar of the wheel rotation, in SI units m/s$^2$, using the following equation (3):

$$Ar=(V2-V1)/(Tt2-Tt1) \quad (3)$$

In equation (3), V1 and V2 are speed calculated at time period Tt1 and Tt2, respectively.

In addition, as described above with respect to FIG. 3, the gyro MEMS 134 of the example wheel sensor 32 may be integrated into the same component as the magnetic field MEMS 130 may be formed by a stand-alone component. The gyro MEMS 134 can also measure angular acceleration Aα in degrees per second (°/s). The MCU 120 calculates the linear acceleration Ac in SI units m/s$^2$ using the following equation (4):

$$Ac=(D/2) \times A\alpha \quad (4)$$

In equation (4), D is the diameter of the wheel in SI units (meter).

Ac is used to correct acceleration Ar to improve the accuracy of the calculation of acceleration. Data corresponding to one or both of the acceleration values Ac and Ar may be transmitted to the host device 30 for further processing.

Also, the MCU 120 can calculate an average linear acceleration A based on comparison of Ar and Ac. The calculation of average linear acceleration A can use any standard methods for calculating averages over the period of time. Data corresponding to the average linear acceleration A can also be transmitted to the host device 30 from the wheel sensor 32.

5. G-Forces and Vibration Noise

In addition, as described above with reference to FIG. 3, the accelerometer or g-sensor MEMS 132 may be included in the example wheel sensor 32 by integrating the MEMS 132 into the same component as the magnetic field MEMS 130 or the gyro MEMS 134, or the g-sensor MEMS 132 be a stand-alone component. An accelerometer determines g force acceleration in still position projected onto a 3-axis X, Y, Z coordinate system as generally illustrated FIG. 9. Combined, the three values associated with X, Y, and Z coordinates show the g force along a direction extending to the center of the earth. The acceleration component of the g force in still position is 9.8 m/s$^2$. The direction of the g forces will be in a line extending from the g-sensor MEMS 132 to the center of the earth and can generally be considered orthogonal to true horizontal.

When the wheel is in motion, the centrifugal force Fc applied to the wheel sensor is also projected on 3 axis of accelerometer, X, Y, Z. The total values recorded on axis X, Y, Z is the sum of accelerations created by the g force and centrifugal force Fc. However, since the traveling surface is not always smooth, vibration forces may be reflected on all three axes of the accelerometer MEMS 132. Further, shocks generated by traveling over road bumps and holes also create spikes of measurement in accelerometer data. When "noise" associated with vibrations and shocks is generated, the gyro MEMS 134 also can be affected. In this case, the value of Ac linear acceleration can be less trusted as an indication of true or real linear acceleration. Under these conditions, the logic implemented by software running on the MCU 120 reduces the impact or effect of Ac in calculating average acceleration A or, in some scenarios, completely remove Ac from calculations, until the noise level associated with vibrations and/or shocks is reduced to normal (e.g., below an acceptable threshold). Data associated with the detection of accelerometer values indicative of periods of vibration and shock noise can also be reported to the host.

6. Angle of a Slope of a Surface

In one embodiment of the sensor system 20 as described with reference to FIG. 3 above, the example frame sensor 34 contains the MCU 120, transmitter 122, accelerometer MEMS 132, gyro MEMS 134, and, optionally, the magnetometer MEMS 130. As generally described above, the frame sensor 34 is positioned on or arranged in a fixed position relative to the frame 70 of the vehicle 22. On a bicycle, the frame sensor 34 may be arranged under the seat 72 or on the down tube 74, the head tube 76, the top tube 78, or anywhere else on the frame 70 of the vehicle 22.

Figure 9:
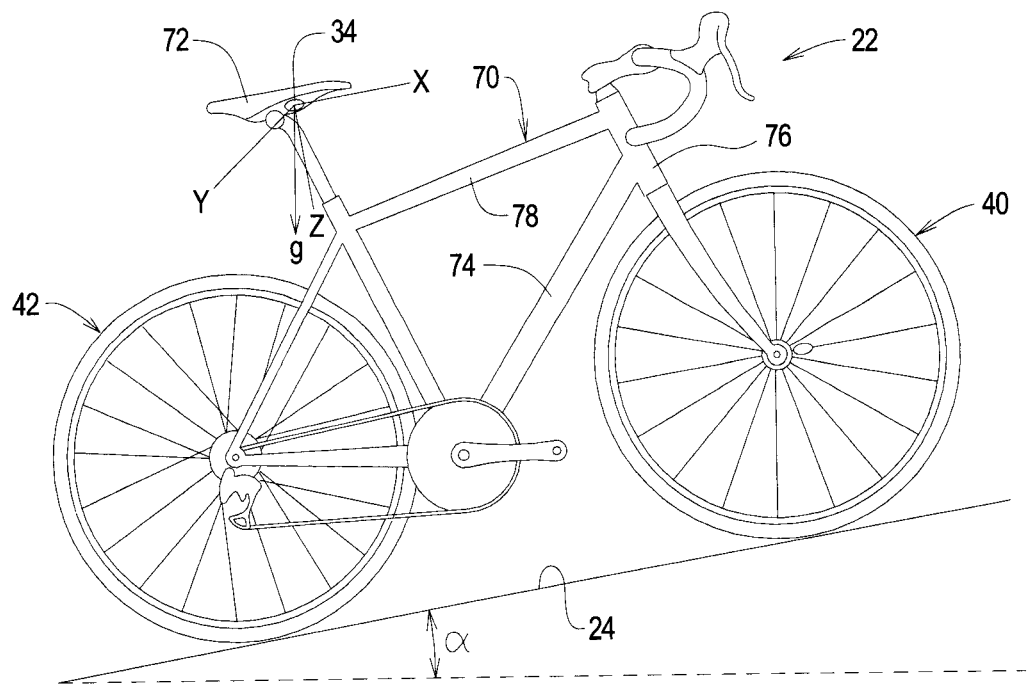
FIG. 9 is a side plan view of a bicycle forming the vehicle of FIG. 1 on an incline that may be determined using an example frame sensor of the example sensing system.

The accelerometer or g-sensor MEMS 132 may be used to calibrate the position of the frame sensor 34 relative to the road surface 24 as depicted in FIG. 9. When the vehicle 22 is supported in a still position as shown on FIG. 9, the 3-axis accelerometer MEMS 132 inside the frame sensor 34 under the seat 72 shows the direction of the g force, which is known to point to the center of the earth, relative to the frame sensor 34. This reference system may be used to calculate the angle α of the slope of the road surface 24 along which the vehicle 22 is moving.

Figure 10:
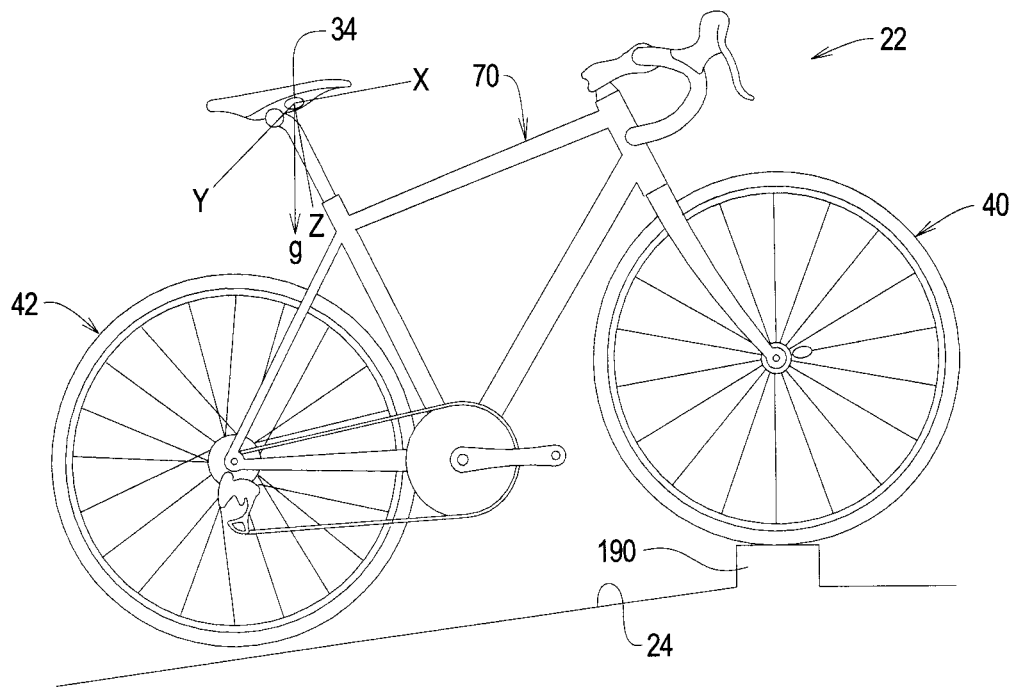
FIG. 10 is a side plan view of a bicycle forming the vehicle of FIG. 1 illustrating a step in the process of calibrating the frame data generated by an example frame sensor of the sensor system of the present invention.

For vehicles such as the example vehicle 22 having at least two wheels (i.e., at least one front wheel and at least one rear wheel), the position of one wheel relative to the other identifies angle of a slope. To calibrate this angle for a two wheel vehicle such as the bicycle 22 as shown in FIG. 10, the front wheel 40 is placed on a curb 190, a rock, or any other object elevated relative to the ground or road surface 24 while the rear wheel 42 is placed on the ground or road surface 24. The accelerometer MEMS 132 reports (i.e., calculates and stores) the direction of the g force via X, Y, Z values along each of the three axes associated with the accelerometer MEMS 132. Then the vehicle 22 is turned around (180 degrees) so that the rear wheel 42 is placed on the same curb 190, rock, or elevated object and the front wheel 40 is placed on the same position on the ground or road surface 24. The frame sensor 34 then reports the direction of the g force in this second or reversed position and uses both values to calculate the direction of the g force relative to the accelerometer MEMS 132. Based on values representing this direction, the angle of the vehicle relative to true horizontal may be calculated.

While the vehicle 22 is motion as shown on FIG. 9, the accelerometer or g-sensor MEMS 132 in the frame sensor 34 projects acceleration of forward motion mainly on the axis somewhat parallel to the travelling surface 24 of the vehicle 22. In the example depicted in FIG. 9, the axis somewhat parallel to the traveling surface is the X axis. This projection offsets the overall direction of the g force. Therefore, the calculation of an angle of a surface slope may be unreliable. To improve the calculation of the angle of the surface slope, the direction of the true g force in motion the actual vehicle's linear acceleration is subtracted from the acceleration projected on the X axis associated with the accelerometer.

The acceleration of the wheel A is calculated from the angle of wheel rotation. For example, if the magnet field is sampled at three discrete time events T1, T2, and T3 spaced at equal time periods (e.g. 10 milliseconds) apart, then the wheel rotation angle between T1 and T2 is Ω1 and between T2 and T3 is Ω2. The wheel angular acceleration is the change of the angle over time as calculated using the following equation (5):

$$A=(\Omega 2/(T3-T2)-\Omega 1/(T2-T1))/(T3-T1) \quad (5)$$

A vehicle such as the example vehicle 22 on a surface that is not smooth. Anomalies in the road surface, such as road joints, rough terrain, and other irregularities in the road surface create turbulence or nose that can adversely affect the measurement of acceleration. In a stationary position in which the accelerometer MEMS 132 is positioned so that the X axis thereof is somewhat parallel to the traveling surface, the Y axis displays a value equivalent to the g force. However, while in motion, the value of g force projected on the Y axis is offset by the noise created by vibrations and shocks from the frame and traveling surface. To dampen or compensate for this noise, the example frame sensor 34 includes the gyro MEMS 134. The gyro MEMS 134 is oriented the same way as accelerometer MEMS 132, with the X, Y, Z axes of both of the MEMS 132 and 134 aligned (i.e., axes pointing into the same directions). As generally described above, the MEMS 132 and 134 may be two independent MEMS or one MEMS module in which both the accelerometer MEMS 132 and the gyroscope MEMS 134 are integrated in a single electronic component.

Combining measurements from the accelerometer MEMS 132 with measurements from the gyro MEMS 134 on each of the axis X, Y, Z substantially reduces the noise in accelerometer data, which enhances accurate calculation of the direction of the true g force in motion. Knowing the direction of true g force, the system may calculate the angle α of the travelling surface 24 relative to the horizon or true horizontal.

7. Lateral Motion

Vehicles such as the example bicycle 22 also create or experience lateral (e.g., left-right or side to side) motion. While a cyclist is riding the bicycle 22, the cyclist pushes the pedals (not shown) in a circular motion relative to the frame 70 and an up and down motion relative to the riding surface 24. During pedaling, the frame 70 of the bicycle 22 sways slightly left and right. In this case, the lateral movement of the bicycle 22 corresponds to the push of each pedal. When the cyclist pushes down on the right pedal and possibly pulls up on the left pedal, the bicycle 22 leans slightly to the right. When the cyclist pushes the left pedal down and possibly pulls up on the right pedal, the bicycle 22 leans slightly to the left. As shown on FIG. 9, the axis Y of the gyro MEMS 134 in the frame sensor 34 is positioned generally horizontal (i.e., substantially parallel to the traveling surface 24) and substantially perpendicular to the traveling path or direction of the bicycle 22. The lateral motion of the bicycle 22 will create positive and negative angular acceleration values relative to the Y axis of the gyro MEMS 134. The frequency of change of angular acceleration from positive to negative and back to positive corresponds to cadence of cycling motion, which is typically measured in rotations of the crank per minute or RPM.

Also, combining all three values from X, Y, and Z axes of accelerometer MEMS 132 with the values associated with the X, Y and Z axis of gyro MEMS 134 of the frame sensor 34, the leaning angle of a bicycle 22 relative to true vertical orientation may be calculated.

8. Overall Motion

The system as shown on FIG. 1 thus consists of two sensors: the wheel sensor 32 installed on or associated with one of the wheels 40 and 42 of the vehicle 22, and the frame sensor 34 installed on or associated with the frame 70. As described with reference to FIG. 3, the MCU 120 runs software that implements logic to collect and process data from the magnetic field MEMS 130, the accelerometer MEMS 132, and the gyro MEMS 134. The processed data is then sent via the wireless transmitter 122 to the host device 30 having a compatible wireless receiver.

The wheel sensor 32 calculates the angle of wheel rotation, traveling distance, speed, acceleration, and g forces. The frame sensor 34 calculates the grade of an angle of travelling surface relative to horizon in percent, the direction of the gravity g force, cadence, the lateral leaning angle and the frequency of change for lateral leaning from left to right.

Both sensors accumulate the calculated values in memory and average them as new values are calculated and added to the memory. Periodically the MCU 120 of either of the sensors 32 and 34 sends the calculated values via wireless communication transmitter 122, such as Bluetooth, ANT+ or Zigbee to the host device 30. The host device runs a software program capable of storing, processing, and/or displaying the data in raw or processed forms. The wireless communication time interval is usually set by the host device 30. The communication interval and MEMS sampling rate is or may be asynchronous. For example, the communication time interval can be every 100 milliseconds (10 Hz) but the internal sampling frequency could be 10 milliseconds (100 Hz). The MCU 120 has non-volatile internal memory (RAM or Flash) to store calculated values and send them to the host when requested. After the data is transmitted from the sensors 32 and 34 to the host device 30, the memory of the MCU 120 may be erased to conserve memory. Values used to calculate average or incremental change, such as average speed or total distance traveled, will be stored for sufficient time to calculate such average or incremental change.

The sensor system 20 is of particular significance when applied to bicycles, but can be used as described or with minor modification on tricycles, four wheel powered or non-powered vehicles, wheel chairs for sports and commuting, cars, trucks, and any other vehicles on wheels. It is possible that not all parameters can be measured and calculated on all the above mentioned vehicles. However, the example sensor system 20 may be used to calculate values associated with operational characteristics such as the angle of the wheel motion, direction of the wheel motion, linear distance, speed, acceleration, and the angle or the grade of a road surface.

What is claimed is:

1. A sensor system for use with a host device and a vehicle comprising a frame and at least one wheel, the sensor system comprising:
   a first sensor associated with the at least one wheel of the vehicle, where the first sensor is configured to sense raw wheel data indicative of a rotational movement of the at least one wheel, the raw wheel data being sensed with respect to one of: a magnetic pole of the Earth or a magnet attached to the frame;
   a microcontroller configured to
      detect, during the rotational movement of the at least one wheel, changes in the raw wheel data; and
      determine, based on the changes in the raw wheel data, wheel data, the wheel data including a rotational angle of the at least one wheel, a full revolution count of the at least one wheel an angle of a revolution of the at least one wheel, a rotational direction of the revolution of the at least one wheel, and an angular acceleration of the at least one wheel; and
   a transmitter configured to transmit the wheel data to the host device.

2. A sensor system as recited in claim 1, further comprising a second sensor associated with the frame of the vehicle, where the second sensor:
   senses frame data, the frame data including at least one of: a grade of an angle of travelling surface relative to horizon in per cent, a direction of gravity, a cadence, a lateral leaning angle, and a frequency of change for lateral leaning from left to right indicative of movement of the frame with respect to the direction of gravity; and
   wherein the transmitter is further configured to transmit the frame data to the host device.

3. A sensor system as recited in claim 1, further comprising a communications system for wirelessly transmitting data between the host device and the first sensor and between the host device and the second sensor.

4. A sensor system as recited in claim 1, in which the first sensor comprises a magnetometer.

5. A sensor system as recited in claim 2, in which the second sensor comprises an accelerometer.

6. A sensor system as recited in claim 2, in which:
   the first sensor comprises a magnetometer; and
   the second sensor comprises an accelerometer.

7. A sensor system as recited in claim 6, in which:
   the first sensor senses the raw wheel data based on raw magnetic field data generated by the magnetometer; and
   the second sensor senses the frame data based on raw acceleration data generated by the accelerometer.

8. A sensor system as recited in claim 2, in which:
   the first sensor comprises
      a magnetometer; and
   the second sensor comprises
      an accelerometer, and
      a gyroscope.

9. A sensor system as recited in claim 2, in which:
   the host device is configured to determine, based on the wheel data, at least one of, a speed of the vehicle, a distance traveled by the vehicle, and a linear acceleration of the at least one wheel; and
   the frame data further includes at least one of an angle of the frame with respect to horizontal and lateral motion of the frame.

10. A sensor system as recited in claim 1, wherein:
    the microcontroller configured to:
       store calibration data indicative of the rotational movement of the at least one wheel, wherein the calibration data are generated from raw wheel data generated during rotation of the at least one wheel at a substantially even rate of the rotation; and
       determine, based on the raw wheel data and the calibration data, the wheel data.

11. A sensor system as recited in claim 2, in which the second sensor stores frame calibration data generated from the frame data associated with two angular positions of the frame with respect to the direction of gravity, where the frame data is calibrated using the frame calibration data.

12. A sensing method for use with a host device and a vehicle comprising a frame and at least one wheel, the method comprising the steps of:
    associating a first sensor with the at least one wheel of the vehicle;
    sensing, by the first sensor, raw wheel data indicative of a rotational movement of the at least one wheel, the raw data being sensed with respect to one of: a magnetic pole of the Earth or a magnet attached to the frame;
    during the rotational movement of the at least one wheel, detecting, by a microcontroller, changes in the raw wheel data;
    determining, by the microcontroller, based on the changes in the raw wheel data, wheel data, the wheel data including a rotational angle of the at least one wheel, a full revolution count of the at least one wheel, an angle of a revolution of the at least one wheel, a direction of the revolution of the at least one wheel, and an angular acceleration of the at least one wheel; and
    transmitting, by a transmitter, the wheel data to the host device.

13. A sensing method as recited in claim 12, further comprising the steps of:
    associating a second sensor with the frame of the vehicle; and
    sensing by the second sensor, frame data indicative of a movement of the frame with respect to a direction of gravity; and
    transmitting, by the transmitter, the frame data to the host device.

14. A sensing method as recited in claim 13, further comprising the steps of:
    wirelessly transmitting the wheel data from the first sensor to the host device; and
    wirelessly transmitting the frame data from the second sensor to the host device.

15. A sensing method as recited in claim 13, in which:
    the step of sensing the wheel data comprises sensing the wheel data based on raw magnetic field data generated by a magnetometer; and the step of sensing the frame data comprises sensing the frame data based on raw acceleration data generated by the accelerometer.

16. A sensing method as recited in claim 13, further comprising the steps of:
    determining at least one of an angle of rotation of the at least one wheel, a rotational direction of the at least one wheel, speed of the vehicle, a distance traveled by the vehicle, and an acceleration of the at least one wheel based on the wheel data; and
    determining at least one of an angle of the frame with respect to horizontal and lateral motion of the frame based on the frame data.

17. A sensing method as recited in claim 12, further comprising:
    storing, by the microcontroller, calibration data indicative of the rotational movement of the at least one wheel, wherein the calibration data are generated from raw wheel data generated during rotation of the at least one wheel at a substantially even rate of the rotation; and
    determining, by the microcontroller, based on the raw wheel data and the calibration data, the wheel data.

18. A sensing method as recited in claim 13, further comprising the steps of:
    generating frame calibration data from the frame data associated with two angular positions of the frame with respect to the direction of gravity; and
    calibrating the frame data based on the frame calibration data.

19. A sensor system for use with a host device a vehicle comprising a frame and at least one wheel, the sensor system comprising:
    a first sensor associated with the at least one wheel of the vehicle, where the first sensor comprises a first magnetometer; and
    a second sensor associated with the frame of the vehicle, where the second sensor comprises a second accelerometer and a second gyroscope;
    wherein the first sensor is configured to sense raw wheel data indicative of a rotational movement of the at least one wheel, the raw data being sensed with respect to one of: a magnetic pole of the Earth or a magnet attached to the frame, the raw wheel data being sensed based on raw data generated by at least one of the first magnetometer;
    wherein the second sensor is configured to sense frame data indicative of a movement of the frame with respect to a direction of gravity, the frame data being sensed based on raw data sensed by at least one of the second accelerometer and the second gyroscope;
    a microcontroller configured to:
        detect, during the rotational movement of the at least one wheel, changes in the raw wheel data; and
        determine, based on the changes in the raw wheel data, wheel data, the wheel data including a rotational angle of the at least one wheel, a full revolution count of the at least one wheel, an angle of a revolution of the at least one wheel, a direction of the revolution of the at least one wheel, and an angular acceleration of the at least one wheel; and
    a transmitter configured to transmit the wheel data and the frame data to the host device.

20. A sensor system as recited in claim 19, wherein the second sensor further comprises:
    a second microcontroller for generating the frame data based on the raw data generated by at least one of the second accelerometer and the second gyroscope, and
    a second transmitter for transmitting the frame data to the host device.

21. A sensor system as recited in claim 19, in which:
    the wheel data further includes at least one of a rotational direction of the at least one wheel, a speed of the vehicle, a distance traveled by the vehicle, and a linear acceleration of the at least one wheel; and
    the frame data further includes at least one of an angle of the frame with respect to horizontal and lateral motion of the frame.

22. A sensor system as recited in claim 19, wherein the microcontroller configured to:
    store calibration data indicative of the rotational movement of the at least one wheel, wherein the calibration data are generated from raw wheel data generated during rotation of the at least one wheel at a substantially even rate of the rotation; and
    determine, based on the changes in the raw wheel data, wheel data, the wheel data.

23. A sensor system as recited in claim 19, in which the second sensor stores frame calibration data generated from the frame data associated with two angular positions of the frame with respect to the direction of gravity, where the frame data is calibrated using the frame calibration data.

24. A sensor system as recited in claim 20, in which:
    the first MCU stores wheel calibration data generated from raw wheel data generated during free rotation of the at least one wheel, where the wheel data is calibrated using the wheel calibration data; and
    the second MCU stores frame calibration data generated from raw frame data associated with two angular positions of the frame with respect to the direction of gravity, where the frame data is calibrated using the frame calibration data.

* * * * *